April 18, 1933.　　　S. O. A. FIEDLER　　　1,904,431
FEED WATER HEATING PLANT
Filed May 4, 1928　　　6 Sheets-Sheet 1
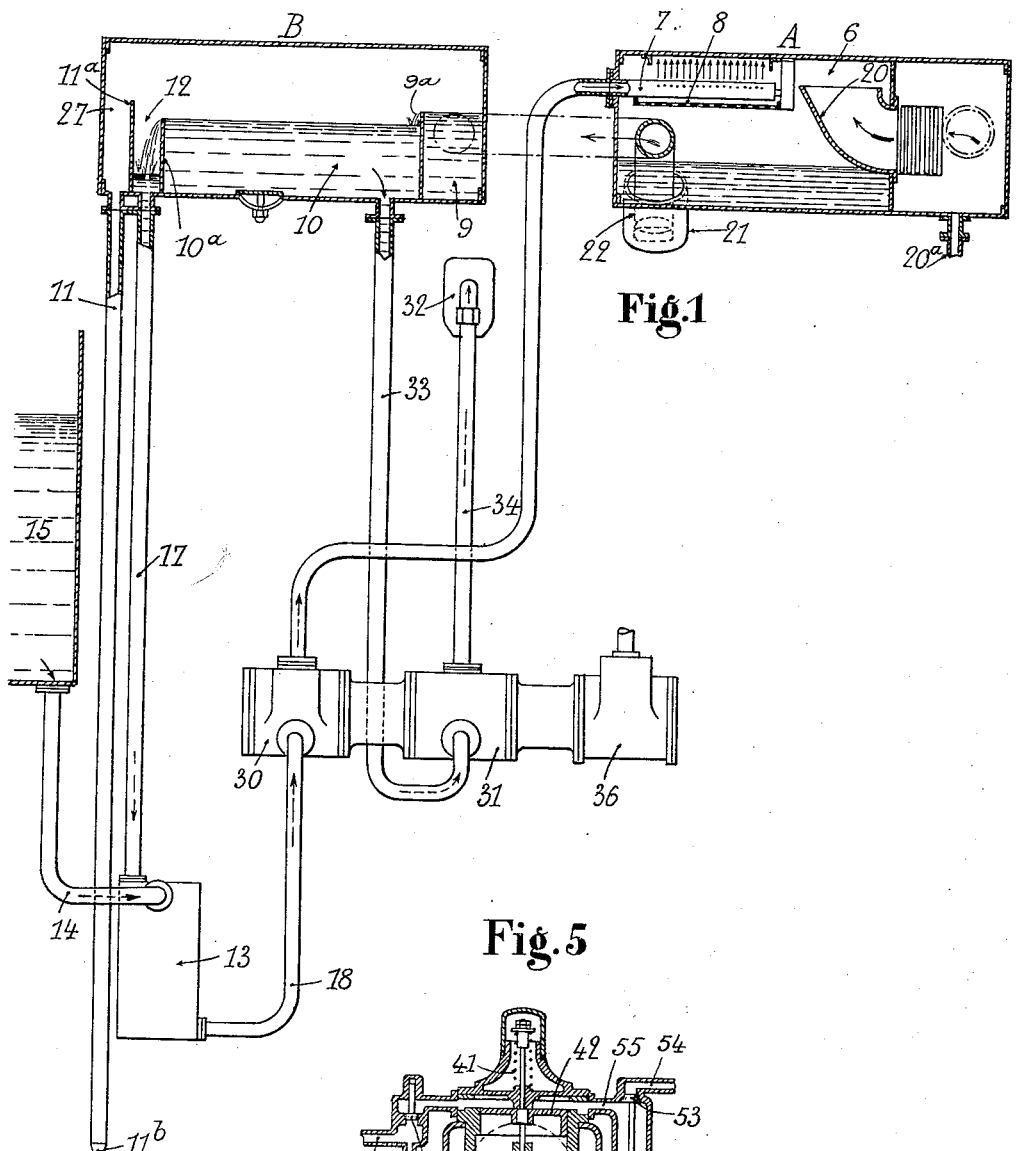
Sébastien Otto Alfred Fiedler
INVENTOR
By Otto Munk
his ATTORNEY.

April 18, 1933.  S. O. A. FIEDLER  1,904,431
FEED WATER HEATING PLANT
Filed May 4, 1928  6 Sheets-Sheet 2
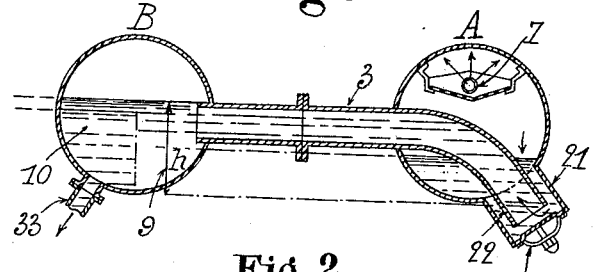
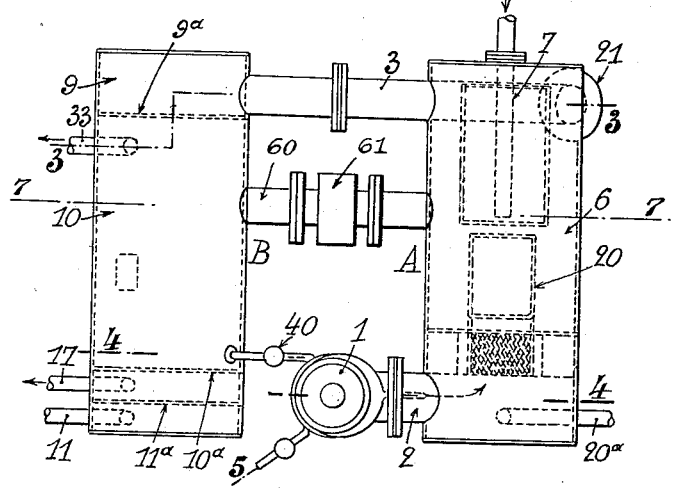
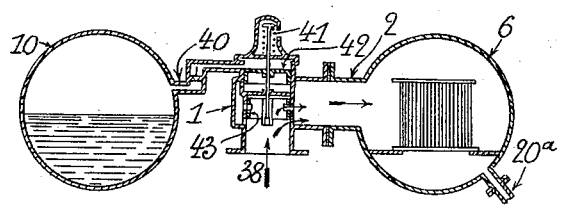
Sébastien Otto Alfred Fiedler
INVENTOR
his ATTORNEY.

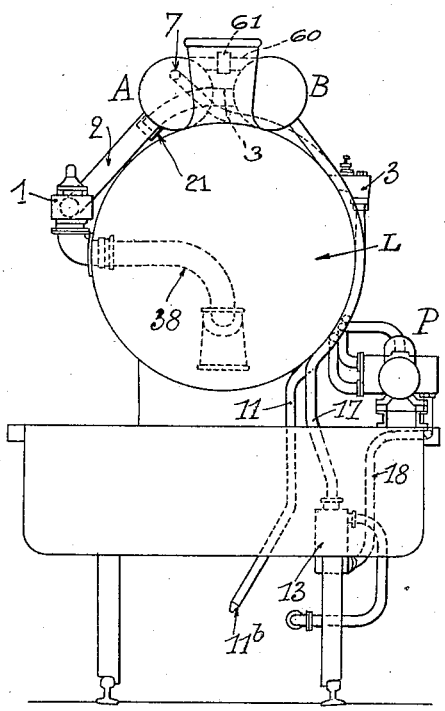
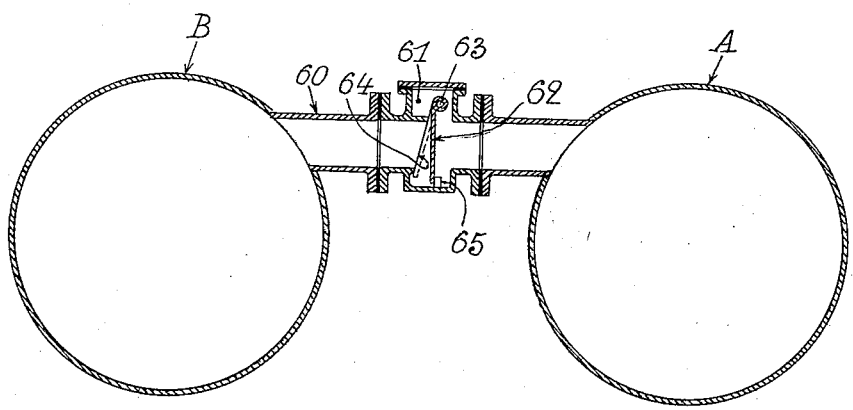

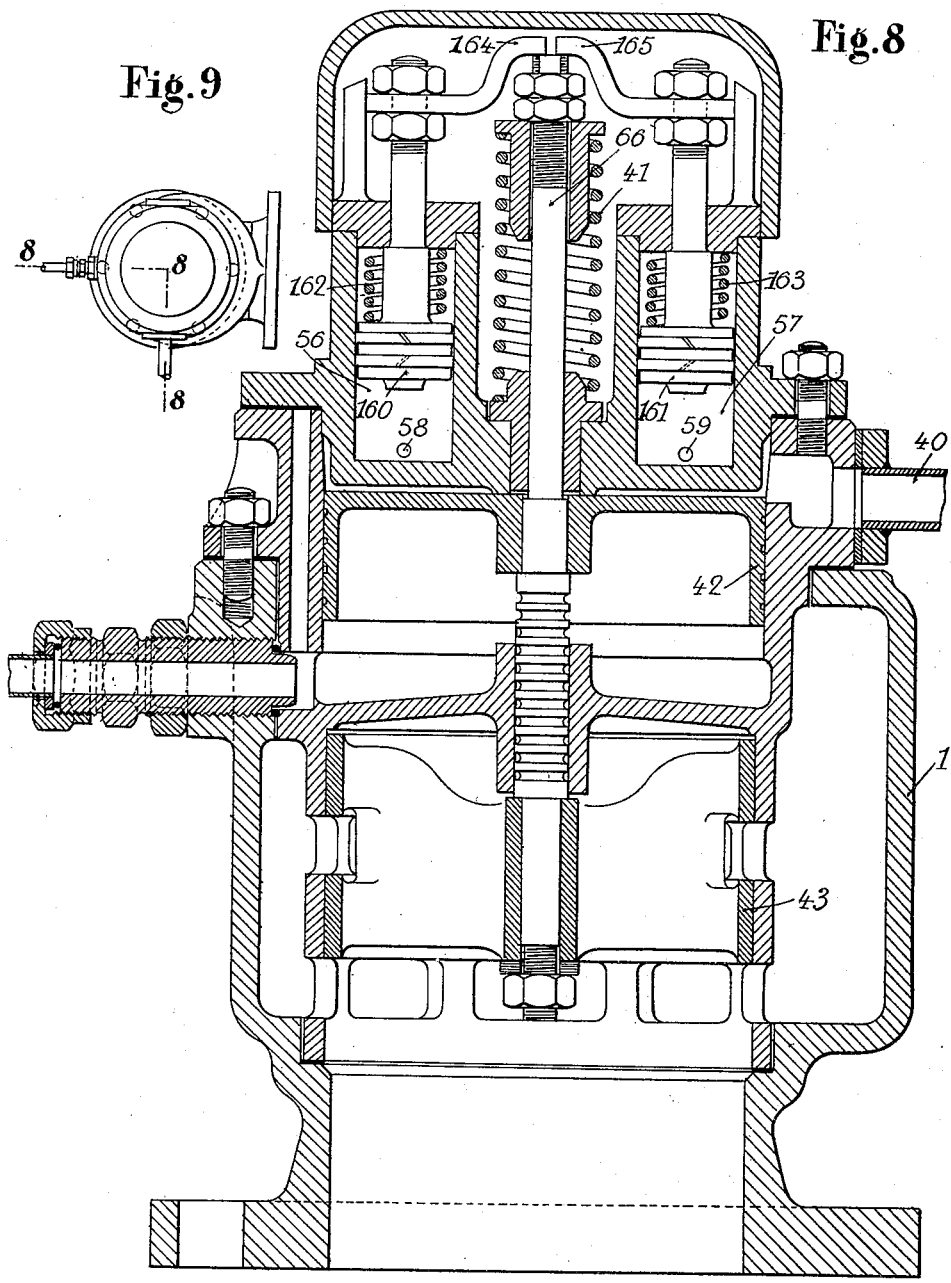

April 18, 1933.  S. O. A. FIEDLER  1,904,431
FEED WATER HEATING PLANT
Filed May 4, 1928   6 Sheets-Sheet 5
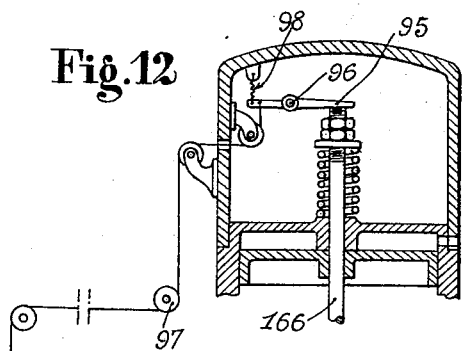
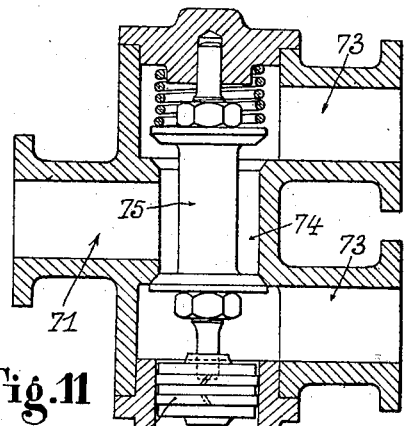
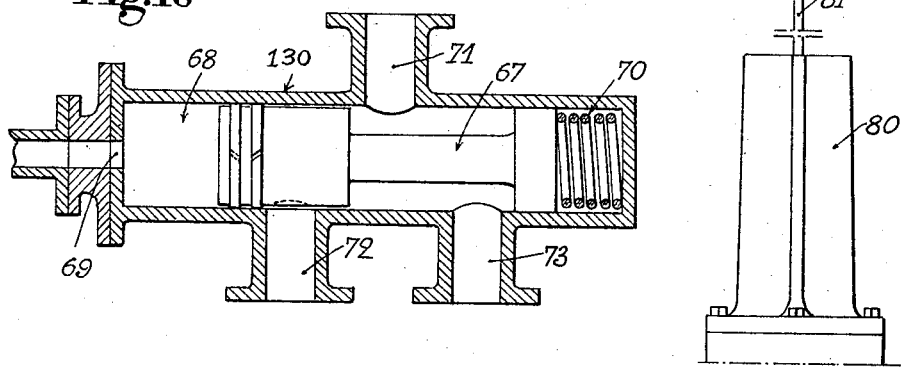
Sébastien Otto Alfred Fiedler
INVENTOR;
By Otto Munk
his ATTORNEY.

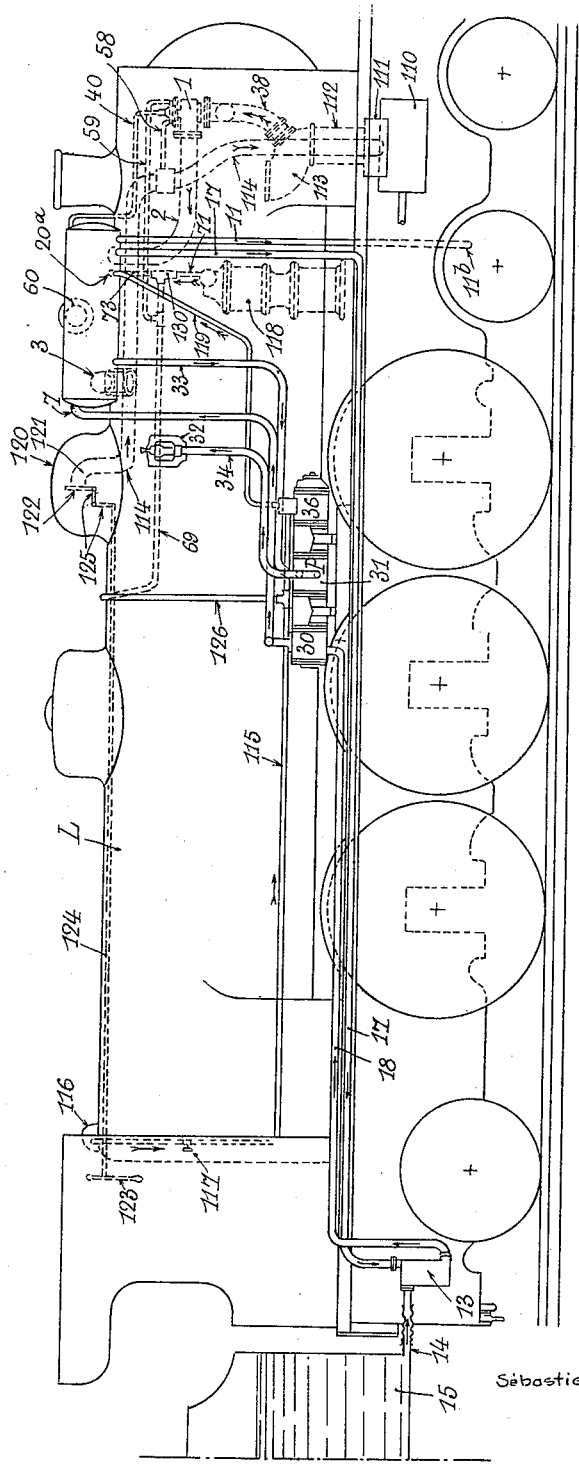

Patented Apr. 18, 1933

1,904,431

UNITED STATES PATENT OFFICE

SÉBASTIEN OTTO ALFRED FIEDLER, OF PARIS, FRANCE, ASSIGNOR TO L'AUXILIAIRE DES CHEMINS DE FER ET DE L'INDUSTRIE, OF PARIS, FRANCE

FEED WATER HEATING PLANT

Application filed May 4, 1928, Serial No. 275,091, and in France May 16, 1927.

The present invention relates to feed water heating plants and more particularly to such plants comprising a feed water heater in which the feed water is heated by contact with exhaust steam and the like. The invention is illustrated as embodied in a feed water heating plant of locomotive boiler, and it has for its object various improvements, which will be set forth in the following description and claims.

In the appended drawings, which shows by way of example an embodiment of the feed water heater according to the invention:

Fig. 1 is a diagrammatic view of a feed water heating plant according to the invention, the two heater units being shown in section and located in alignment, for the sake of clearness.

Fig. 2 is a plan view of the heater.

Fig. 3 is a sectional view taken along the line 3—3 of Fig. 2.

Fig. 4 is a sectional view taken along the line 4—4 of Fig. 2, showing the regulator.

Fig. 5 shows the regulator in section, along the line 4—5 of Fig. 2, and at a somewhat larger scale.

Fig. 6 shows diagrammatically the heating plant as arranged upon a locomotive.

Fig. 7 is a transverse section along the line 7—7 of Fig. 2.

Fig. 8 is a vertical section along the line 8—8 of Fig. 9, showing a modification of the regulator expander.

Fig. 9 is a plan corresponding view.

Figs. 10 and 11 show two embodiments of by-pass arrangements mounted upon the exhaust conduit of the compressed air pump, and Fig. 12 is a diagrammatic view of a mechanical device for controlling the closing of the regulator.

Fig. 13 is a side elevational view corresponding to Fig. 6.

Referring to Figs. 6 and 13, L denotes a locomotive, 15 the cold water tank in the tender, 110 the locomotive engine, A, B the two units forming the feed water heater, and P the feed water pump.

Cold water from the tender flows by gravity through a tube 14 into a suction vessel 13, connected by a tube 18 to the intake of the cold water cylinder 30 of pump P, which further comprises a hot water cylinder 31 and a steam motor cylinder 36. Steam motor cylinder 36 is supplied with live steam from a steam supply 116 through a pipe 115, fitted with a control valve 117.

Cylinder 30 may operate synchronously or not with cylinder 31, but should have a larger delivery than said cylinder 31; the provision of the suction vessel 13 prevents air from getting into the plant, avoids the failing of the pump 30 and allows a lack of synchronism between both cylinders of the pump.

Cylinder 30 of pump P forces cold water through a tube 7 into unit A of the heater, which is supplied with exhaust steam from the engine. For this purpose, an exhaust steam conduit 38 opens into the blower 113 mounted within the smoke box at the end of the exhaust collector 112 of the valve chest 111 of the engine 110. Exhaust steam is thus diverted in suitable amount through conduit 38 into a regulator 1, to be further described, and thence through a conduit 2 into unit A of the heater, wherein steam is mixed with water from pipe 7 to heat the latter. Said unit A is preferably also supplied with exhaust steam from cylinder 36 of pump P through a pipe 119 and from the steam cylinder 118 of the air compressing pump, through a pipe 71, a by-pass device 130, to be further described, and a pipe 73, pipes 119 and 73 preferably ending in a common pipe 20ª.

The heated water flows from unit A through a tube 3 into unit B, whence it is supplied to the intake of the hot water cylinder 31 of pump P through a pipe 33. Cylinder 31 forces said water through pipe 34 and the boiler inlet valve 32 into the boiler.

Steam generated in the boiler collects in the dome 120 and enters the throttle pipe 121 in an amount which is controlled by the throttle slide 122, actuated as usual from the driver's cab through a lever 123, rod 124 and suitable pivoting arms, in the usual manner.

Steam then passes through pipe 114 and enters the valve chest 111 of the engine.

Referring now to the construction of the heater shown in Figs. 1 to 4, the heater unit A comprises a mixing chamber 6 through which extends pipe 7 leading from cylinder 30 of pump P (Fig. 6).

Pipe 7 is suitably apertured whereby the liquid will be discharged therefrom in divided jets, directed upwardly. The liquid then drops upon a perforated plate 8, by which it is divided into a fine spray which falls in chamber 6. The steam from pipes 2 and 20$^a$ is supplied to chamber 6 through a bend 20 opening towards the upper part of said chamber.

The heater unit A is provided at its lower part with a pocket 21, closed at the lower end by a sealing door 23 which may be opened for cleaning purposes.

As above stated, the heater units A and B are in communication with one another by means of a pipe 3, opening into the first chamber 9, of the second unit B, the other end of said pipe being bent downwardly at 22, and projecting into pocket 21 adjacent the bottom thereof, thus constituting a water seal.

Chamber 9 in which the heated liquid reaches a constant level, which is determined by the height of a partition or weir 9$a$ communicates with a compartment 10 above said weir. Compartment 10 constitutes a storage chamber for the heated liquid and is so disposed that the level of the liquid in compartment 10 will remain constant and below the upper level of the liquid in compartment 9. Compartment 10 is connected to the intake of the hot water cylinder 31 by pipes 33.

Compartment 12 which follows compartment 10, is adapted to receive the overflow from compartment 10. In normal conditions, the level of the liquid in said compartment 10 is thus prevented from exceeding the level of the upper edge of the partition or weir 10$a$ which is located between compartments 10 and 12. Said compartment 12 is connected to suction vessel 13 by a pipe 17; the disposition is such that the tube 17, by which said vessel is connected to compartment 12, as well as the tube 14, by which it is connected to the tender 15, both open at its upper part, while the tube 18, leading to the admission of the pump, opens at its lower part.

Following compartment 12 is a compartment 27, which is bounded by a partition 11$a$, extending up to a certain level in unit B. A tube 11, opening at the lower part of compartment 27, is adapted to afford communication between heater unit B and the atmosphere. It is formed at the lower part with a discharge nozzle 11$^b$ of small section.

Steam is admitted through the regulator 1 and tube 2 into compartment 6, where it is mixed with the liquid, which is sprayed in vertical jets through the apertures of pipe 7, impacts against the wall 8, where it is atomized, and falls through the holes of plate 8, thus achieving the condensation of the steam.

The liquid which is thus heated and is mixed with the steam which may remain uncondensed, flows upwardly through the bent part 22 and the pipe 3 under the action of the pressure in compartment 6. The depth of the bent part 22 will be calculated in accordance with the mean pressure of the heating steam which is available, so as to produce the difference of levels which corresponds to said pressure. Furthermore, the level of the liquid in compartment 6 should always be materially lower than that of perforated plate 8. The mixture of heated liquid and condensed steam flows up in compartment 9, proceeds over the edge of weir 9$^a$ in a thin sheet and falls down into compartment 10 through a height equal to the difference of the levels of the liquid in compartments 9 and 10 respectfully.

The gases dissolved in the liquid are disengaged by the heating, and begin to separate from the liquid, due to the upward flow of the liquid in compartment 9. Said gases will be completely discharged from the liquid after the latter has been spread out over the edge of weir 9$^a$, and has fallen into compartment 10. Said gases escape to the atmosphere through tube 11 and nozzle 11$b$.

Referring to the construction of the regulator shown in Fig. 8, 1 denotes the regulator-expander, which comprises a valve 43 urged by a spring 41 toward the opening position; said valve is controlled by a piston 42, whose upper face is subjected to the pressure prevailing in the gas discharging chamber or unit B by means of tube 40. Said regulator-expander also comprises two auxiliary cylinders 56 and 57; cylinder 56 is connected by a conduit 58 with the valve chest 111 of the high pressure cylinders of the main engine, or, as shown, with the steam supply pipe 114 (Fig. 13) thereof; cylinder 57 is connected by a conduit 59 with a pipe 126 opening into the steam supply pipe 115 of the steam cylinder 36 of the feed water pump. Pistons 160 and 161 are respectively slidable in said cylinders and are urged towards the bottom thereof by springs 162 and 163. The piston rods carry respective fingers or stop members 164 and 165 adapted to actuate, or stop the movement of, the piston rod 166 of valve 43.

The operation is as follows:

The steam, at the pressure prevailing in the steam cylinder of the feed water pump and in the valve chest of the high-pressure cylinders of the main engine, acts upon the pistons 160 and 161 to maintain the latter in the upper position. Valve 43, urged by its spring 41, is normally kept open, but, if the pressure in the gas discharging chamber B increases, the valve 43 closes. It will be noted that, since unit B is in communication with the atmosphere through tube 11, the normal pressure acting upon the piston 42 will be substantially the atmospheric pressure, while the effective pressure in the mixing chamber will balance the weight of a column of water whose maximum height is $h$ (Fig. 3).

If the effective pressure of the heating steam in the mixing chamber 6 exceeds the weight of said water column, steam will flow directly into compartment B. But, since the latter communicates with the atmosphere by the small tube 11, having a nozzle 11$b$, whose section is so calculated as to be materially insufficient to afford the rapid discharge of the large amount of heating steam proceeding from the mixing chamber, the pressure will immediately increase in compartment B, thus actuating the regulator 1, which will more or less throttle or even cut off the supply of steam. The provision of such a regulator, which communicates with compartment B, has the advantage of eliminating the detrimental effect of the periodic blows of exhaust steam, when the heating plant uses exhaust steam from the engine, as shown in the drawings.

Now, if the admission of live steam to the main engine through pipe 114 is cut off (if, for example, the locomotive is running with the throttle 122 closed) piston 160 will be urged toward the bottom of cylinder 56 and close the valve 43; in this manner, the exhaust steam from the steam cylinder 36 of the feed water pump and from any continuously working steam-operated apparatus, such as the air compressing pump 118, which is delivered to the mixing chamber through pipe 20$^a$, cannot escape to the stack and will thus be condensed in the mixing chamber. On the other hand, if the locomotive operates with induced draught by means of exhaust steam, as shown in Fig. 13, it may happen, with the throttle closed, that the draught of the stack should become sufficient to produce a vacuum in mixing chamber 6, thus cutting off the water flow between compartments 9 and 10 of the heater; the pump 30 still running, the level of the water in chamber 6 may reach the level of bend 20, whereby water may flow into the cylinders of the engine, and cause severe damages. Due to the above described arrangement, this drawback is altogether prevented, since regulator 1 cuts off the communication with the exhaust steam piping 2 as soon as the throttle 122 is closed.

Moreover, when the throttle 122 is closed, the admission of exhaust steam from the engine is cut off, and a loss of pressure immediately takes place in chamber 6. At this instant the level of the water in said chamber is very low, whereby the water of compartment 9 passes into chamber 6. The flow of water from compartment 9 into compartment 10 will thus be interrupted during a certain period, which may be long enough to cause the complete emptying of compartment 10. At this instant, pump cylinder 31 ceases to suck up water and clears itself, thus bringing about the well known drawbacks.

Due to the provision of the automatic closing above described, this drawback is eliminated. As soon as the throttle is closed, regulator 1 automatically cuts off steam conduit 2, whereby the exhaust steam, entering at 20$^a$, instead of escaping through conduits 2, produces an over-pressure in chamber 6, which will be sufficient for maintaining the flow of water from compartment 9 into compartment 10, and for preventing the complete emptying of the latter. Furthermore, the exhaust steam gives up its heat units to the cold water delivered by pump 30, whereby the heating is not completely interrupted with the throttle closed as would occur if the exhaust steam of the auxiliary engines were liable to escape through conduit 2.

Now, if the feed water pump P is stopped, that is, if the admission of live steam through pipe 115 to the steam cylinder 36 of said pump is cut off by closing valve 117, the pressure of the exhaust steam from said steam cylinder decreases in pipe 119 to the atmospheric pressure, whereby piston 161 is moved toward the bottom of cylinder 57 by spring 163, in this movement, the finger 165 presses upon the rod 166 and, hence, brings the valve 43 to the closing position. The exhaust steam from the cylinders of the main engine is thus prevented from getting into the mixing chamber.

The regulator 1 thus provides means, whereby the admission into the feed water heater of exhaust steam from the main engine and also from the auxiliary steam-operated apparatus is prevented when the water pump which supplies the mixing chamber is stopped, thereby preventing the condensation of the exhaust steam from the main engine in the working parts of the auxiliary steam-operated apparatus.

Tube 11, which sets compartment B in communication with the atmosphere, has a comparatively great length, in order that the heated liquid, which may accidentally proceed into compartment 27, should be rapidly discharged through the small nozzle 11$b$ due to the large head of water above said nozzle.

The provision of the long tube 11 with a large head of liquid above nozzle 11$b$ further affords the following advantage: If due to scale deposits subsequent to the heating of feed water, or for any other reason, the section offered to the flow of liquid in tubes 17 and 33 becomes too small, the delivery of the liquid to be heated becomes greater than the delivery of the heated liquid issuing from the heater, and the compartments 12, 10, 9 and 6 become rapidly filled with liquid. The liquid in the compartment 6 is thus liable to reach the level of bend 20 and to flow through the tube 2 and the regulator 1 into the cylinders of the steam engine, or any other apparatus in which it would cause severe damages.

Due to the disposition above described, as soon as the liquid reaches the level of partition 11a, it flows into compartment 27, and, under the effect of the great length of the tube 11, notwithstanding the small dimensions of nozzle 11b, it will be rapidly discharged through said nozzle.

Fig. 6 show the arrangement of the plant upon a locomotive, tube 11 extending around the boiler and opening under the locomotive frame.

Due to the disposition of the liquid supply pipes, leading from the tender 15 and from the overflow compartment 12 and opening at the upper part of suction vessel 13, while the tube 18 connected to the pump cylinder 30 opens at the lower part of suction vessel 13, the excess of liquid which flows into compartment 12 is readily withdrawn therefrom by the pump cylinder 30 which otherwise would have the tendency of sucking up the liquid from the tender rather than the liquid from compartment 12 which would have the drawback of choking up the suction vessel 13, tube 17 and compartment 12, thus eliminating the difference of level between the levels of the liquid in compartments 10 and 9 which is useful for the disengagement of the gases.

It will be noted that the disposition comprising the pocket 21 and the bent pipe 22 forming a water seal and preventing the steam from escaping directly into the heater unit B, affords particular advantages when (as is the case on locomotives) the construction and arrangement of the plant is greatly determined by the condition of minimum bulk. Due to the construction above indicated, pocket 21 may be given the proper shape and dimensions, according to the location of the heater on the boiler, and to the space which is available, while it may also be given the necessary depth corresponding to the effective pressure which should be normally maintained in the mixing chamber.

The shape of the heater, made of two separate bodies, enables readily locating the latter at the upper part of the boiler, on either side of the longitudinal axis.

As shown in Fig. 7, the heater unit A and the heater unit B may communicate with one another by means of a conduit 60, above the water level, said conduit comprising a valve box 61 containing a clack valve 62, pivoted about a horizontal spindle 63, and which may come in engagement with an inclined seat 64 on the side next to chamber B, or upon stops 65, when it falls back by gravity.

The operation of this device is as follows:

In normal running, the mixing chamber is subject to an overpressure corresponding to the effective pressure of the heating steam. The clack valve is so designed as to be applied against its seat 64 by said over-pressure. If, for any reason, the pressure falls in the mixing chamber, which would have for its effect to cause the emptying of the water of receptacle 9 into the mixing chamber 6 with all the subsequent drawbacks above indicated, clack valve 62 leaves its seat 64 under the action of its own weight, and comes at rest against stop 65. In this position the air contained in the chamber B, which is at the atmospheric pressure, passes through the annular space comprised between the walls of clack valve box 61 and clack valve 62, and enters the mixing chamber 6, thus preventing an excessive fall of pressure.

The above device, which assists piston 160 of regulator 1 (Fig. 8) in preventing a fall of pressure in the mixing chamber, may be used alone, that is piston 160 may be eliminated.

It will be seen that, when the feed water pump is stopped, the mixing chamber is only supplied with the exhaust steam from apparatus which operate continuously, namely with exhaust steam from the air compressing pump 118. If the feed water pump is stopped for a long period, such exhaust steam will accumulate in the mixing chamber and assume a pressure which may be sufficient to blow out the water seal, the steam thereby proceeding into the various pipings.

Fig. 10 shows a by-pass arrangement 130 combined with the exhaust conduit 71 of the air compressing pump 118 and adapted to eliminate the above mentioned drawback. A double piston 67 is slidably mounted in a cylinder 68, at one end of which opens a conduit 69 connected to the valve chest of pump P or as shown, through pipe 126, to the live steam supply pipe 115 of the steam cylinder 36 of the feed water pump. At its other end, cylinder 68 encloses a spring 70 adapted to urge piston 67 in a direction reverse to the movement of said piston under the action of live steam. Three branches 71, 72, 73 open into said cylinder and are adapted to be respectively connected with the exhaust pipe 71 of the steam cylinder 118 of the air compressing pump, with the atmosphere and with the pipe 20ª opening into the mixing chamber of the heater. When the feed water pump is operated, live steam from the steam cylinder 36 of said pump, acting through pipes 115, 126 and 69, moves piston 67 against the force of spring 70, thus affording the direct communication between pipes 71 and 73, that is between the exhaust of the steam cylinder of the air pump and the heater. When the feed water pump is stopped, live steam ceases to act upon piston 67, which is moved back by spring 70, thus setting conduits 71 and 72 in communication with one another, whereby the exhaust of the air pump steam cylinder takes place directly in the atmosphere.

Fig. 11 shows a modification of such a by-pass arrangement. The branch 71 connected with the exhaust pipe 71 of the steam cylinder of the air pump 118 opens into a cylindrical chamber 74, provided at both ends with seats for the valve heads of a double valve 75. One end of said double valve is rigid with a piston 76, coaxial with said valve and guided within a bore 78. A spring is disposed between the other end of said valve and a suitable cover for the casing. Branches 72 and 73 open into respective chambers provided on either side of chamber 74.

The operation of this device is as above described with reference to Fig. 10.

Obviously, the invention is not limited to the embodiments herein illustrated. Thus the closing of the regulator-expander as well as the operation of the by-pass device may be controlled either hydraulically, or mechanically, or otherwise.

In order to provide a hydraulic control, it will be sufficient to connect the branch 69 to the delivery end of the water cylinder of the feed water pump and to design pistons 76 and 67 as hydraulic pistons.

Fig. 12 shows diagrammatically and by way of example an embodiment of a mechanical control arrangement for the closing of the regulator when the feed water pump is stopped. The piston rod of the feed water pump is extended outwardly of the cylinder by a sliding rod guided in suitable guides 80. Said sliding rod is pivoted to a connecting rod 81, pivoted at its turn to a crank 82 secured to the end of a shaft 83 mounted in suitable bearings 84. On said shaft 83 is keyed a disc 85, carying an arm 86, at the end of which is mounted a roller or cam follower engaging a cam member 87, mounted loose on shaft 83 and urged by a spring 88 in engagement with said roller. The lateral surface of said cam opposite said arm 86 engages a roller 89 mounted at one end of a crank lever 90, pivoted about a pin 91. The other arm of said crank lever is urged by a spring 92 and carries a roller or pulley 93, constantly engaging a cord or cable 94, secured at one end to a fixed part and attached at the other end to one end of a lever 95, pivoted about a pin 96, said cable being suitably guided upon guiding pulleys. Said lever 95 is urged by a spring 98, so as to maintain its other end in contact with the upper end of the piston rod 166 of the regulator valve 43. The surface of cam 87 which is in contact with the roller of arm 86 has a helicoidal shape, as indicated at 99, and is formed with a stop member 100.

The operation is as follows:

When the pump is operating, the crank-and-rod gear 81, 82, imparts a continuous circular movement to shaft 83. The roller of arm 86 moves upon the helicoidal surface 99 and causes an axial displacement of cam member 87, against the resistance of a spring 88. In its movement, said cam member rotates lever 90, whereby pulley 93 presses upon cable 94, thus producing a tractive force at the end of lever 95, which is thus pivoted about its pivot pin 96. Piston rod 166 of valve 43 is thus free to move upwardly under the action of spring 41, and valve 43 may open. When the end of arm 86 engages stop member 100, cam member 87 is driven in rotation while remaining in its axial position, as long as the pump is running.

As soon as the pump is stopped, shaft 83 also stops and, under the action of spring 88, cam 87 slides back to its initial position while remaining contact with the end of arm 86; lever 90 is moved back by its spring 92 into its initial position while spring 98 restores lever 95 to the position shown in the drawings, said lever pressing upon the piston rod 166, thus closing the valve 43.

Fig. 5 shows another constructional form of regulator 1, showing a modification of the means for closing said regulator at closed throttle. In this embodiment, regulator 1 comprises as above a valve 42 urged by a spring 41 and adapted to be acted upon by the pressure in unit B through pipe 40.

Said regulator also comprises a conduit 50 leading from the valve chest 111 of the engine, or connected to the steam intake conduit 114 of the engine, beyond the throttle 122 or equivalent means for controlling the admission of live steam, said conduit opening into a cylindrical chamber 51 below the under-face of a piston 52 which is movable axially, and carries a valve or needle 53, adapted to control the flow of live steam from a live steam supply pipe 54 into a tube 55 opening into the regulator, above piston 42. The pressure of the live steam, acting upon piston 52 when the throttle is opened, holds the valve 53 against its seat, and the upper face of piston 42 is acted upon by the pressure in the heater unit B by means of conduit 40. If the throttle is closed, the pressure no longer acts upon piston 52, which moves down and valve 53 allows live steam from conduit 54 to flow into conduit 55. Said live steam depresses piston 42, whereby the regulator is brought to the closing position.

Obviously, the invention is not strictly limited to a two-body heater and the heater may be constituted in some cases by a greater or less number of separate units.

Similarly, the details of construction and the arrangement of the whole plant have been given only for the sake of clearness, and these may be modified to a large extent without departing from the scope of the invention.

Having now described my invention, what I claim as new and desire to secure by Letters Patent is:

1. In a feed water heater, a mixing chamber, a hot water container having an orifice of small section in communication with the atmosphere, a water seal between said mixing chamber and said container, means for supplying said mixing chamber with exhaust steam from a discontinuously steam operated apparatus, and throttling means on said steam supplying means responsive to the pressure in said container.

2. A feed water heater comprising in combination a mixing chamber, a hot water container having an orifice of small section in communication with the atmosphere and a water seal between said mixing chamber and said container and adapted to afford the flow of liquid between the latter and to balance the mean normal pressure in said mixing chamber, feed water supplying means for supplying said mixing chamber with feed water to be heated, means for discharging heated water from said container, means for admitting heating steam into said mixing chamber, means for throttling the admission of steam into said mixing chamber, a spring controlled movable member connected to said throttling means and means whereby the pressure in said container is caused to act upon said movable member and to operate said throttling means.

3. In a feed water heater as claimed in claim 1, the provision of means for directly supplying said mixing chamber with exhaust steam from a continuously working steam-operated apparatus, whereby the admission of such steam into said mixing chamber is uncontrolled by said throttling means.

4. A feed water heater comprising a mixing chamber, feed water supplying means for continuously supplying said mixing chamber with water to be heated, means for supplying said mixing chamber with heating steam, a hot water container, a water seal between said mixing chamber and said container adapted to balance the mean normal pressure in said mixing chamber and through which water from said mixing chamber is caused to flow into said container. a partition having an overflow weir in said container for limiting a first compartment adapted to receive heated water from said mixing chamber, and a second compartment adapted to receive the surplus from said first compartment, means affording the discharge of water from said second compartment, a third compartment adapted to receive the surplus water from said second compartment, means for connecting said third compartment with the intake of said feed water supplying means, a fourth compartment adapted to receive any incidental surplus of water from said third compartment, a tube extending from the lower part of said fourth compartment, and a small orifice at the lower end of said tube, at a level materially lower than said container.

5. In a feed water heater as claimed in claim 2, a conduit for connecting said mixing chamber with said container above the normal level of the water therein, and an obturating member in said conduit adapted to be normally closed and to automatically open when the difference of pressure in said container and said mixing chamber exceeds a determined limit.

6. In a feed water heater as claimed in claim 2, a conduit for connecting said mixing chamber with said container above the normal level of the water therein and a freely suspended clack valve in said conduit, said clack valve being adapted to rest on an inclined valve seat in said conduit under the action of the normal pressure prevailing in said mixing chamber and to fall by gravity and recede from its seat when the said pressure falls below a determined limit.

7. In a feed water heater, a mixing chamber, a hot water container having an orifice of small section in communication with the atmosphere, a water seal between said mixing chamber and said container, feed water supplying means for supplying said mixing chamber with feed water to be heated, means for supplying said mixing chamber with heating steam, throttling means on said steam supplying means, responsive to the pressure prevailing in said container, and means operated by the stoppage of said feed water supplying means for locking said throttling means in the closing position.

8. In a feed water heater a mixing chamber, a hot water container having an orifice of small section in communication with the atmosphere, a water seal between said mixing chamber and said container, a steam operated pump for supplying said mixing chamber, with feed water to be heated, a conduit for supplying said mixing chamber with heating steam, a regulator on said conduit comprising a throttling member, a main movable piston connected to said throttling member, a tight cylinder for said piston, means for connecting said cylinder to said container, an auxiliary movable piston, a stop member movable with said auxiliary piston and adapted to control the movement of said main piston, a tight cylinder for said auxiliary piston and means for connecting said latter cylinder to the exhaust of the steam cylinder of said pump.

9. In a feed water heater a mixing chamber, a hot water container having an orifice of small section in communication with the atmosphere, a water seal between said mixing chamber and said container, feed water supplying means for supplying said mixing chamber with feed water to be heated, means for supplying said mixing chamber with heating steam, throttling means on said steam supplying means responsive to the pressure in said container, a conduit for directly supplying said mixing chamber with exhaust steam from a continuously working steam-operated apparatus, whereby the admission of such steam into the mixing chamber is uncontrolled by said throttling means, means operated by the stoppage of said feed water supplying means for locking said throttling means in the closing position, and a movable valve member adapted to be automatically operated by the stoppage of said feed water supplying means for obturating said conduit.

10. In a feed water heater a mixing chamber, a hot water container having an orifice of small section in communication with the atmosphere, a water seal between said mixing chamber and said container, a steam operated pump for supplying said mixing chamber with water to be heated, means for supplying said mixing chamber with heating steam, throttling means on said steam supplying means, responsive to the pressure in said container, a conduit for directly supplying said mixing chamber with exhaust steam from a continuously working steam operated apparatus, whereby the admission of such steam into the mixing chamber is uncontrolled by said throttling means, means, operated by the stoppage of said pump, for locking said throttling means in the closed position, a cylinder on said conduit and having an orifice in communication with the atmosphere, a valve member in said cylinder for connecting the exhaust of said steam operated apparatus with either said mixing chamber or the atmosphere, a piston in said cylinder, operatively connected with said valve member, and means for connecting the steam intake side of the steam cylinder of said pump with said cylinder, whereby said piston is subjected to the pressure of the steam admitted to said pump cylinder.

11. A pressure regulator for controlling the supply of heating steam to a feed water heater, comprising a conduit having a steam inlet orifice and a steam outlet orifice, a spring controlled valve member for throttling said conduit, a main piston movable with said valve member, a tight cylinder for said main piston, a coupling tube opening into said cylinder above said piston, two auxiliary cylinders, auxiliary spring controlled pistons in said cylinders, having respective stop members for controlling the movement of said main piston, and coupling tubes opening into said auxiliary cylinders below said auxiliary pistons respectively.

12. In a feed water heater, a mixing chamber, means for supplying said mixing chamber with heating steam and means responsive to the steam pressure in said steam supplying means for obturating the latter when no steam is admitted therethrough.

13. In a feed water heater, a heating chamber, a pump for forcing water into said chamber, an engine for operating said pump, a compensating chamber, and means utilizing exhaust steam from said engine for forcing water from the heating chamber into the compensating chamber.

14. In a feed water heater, a heating chamber, a pump for forcing water into said chamber, an engine for operating said pump, an inlet pipe for steam into the heating chamber, a valve for controlling the flow of steam into the heating chamber, means operating by exhaust steam from said engine for regulating the water level in the heating chamber, and an inlet to said heating chamber for exhaust steam from said engine located to permit the engine to exhaust into the chamber and maintain steam pressure therein when the inlet of steam through said steam inlet pipe is cut off.

15. In a feed water heater, a heating chamber for receiving steam and water, a steam pump for supplying water to said chamber, and means operated by exhaust steam from said pump for regulating the water level in said chamber.

16. In a feed water heater, a heating chamber, a steam pump for supplying water to said chamber, an inlet pipe for steam into the heating chamber, a valve for controlling the flow of steam into the heating chamber, and an inlet to said heating chamber for exhaust steam from said steam pump to permit the pump to exhaust into the chamber and maintain steam pressure therein when the inlet of steam through said steam inlet pipe is cut off.

17. In a feed water heater, a heating chamber, a compensating chamber, a steam pump for supplying water to said chamber, an inlet pipe for steam into the heating chamber, a valve for controlling the flow of steam into the heating chamber, and an inlet to said heating chamber for exhaust steam from said steam pump to permit the pump to exhaust into the chamber and maintain steam pressure therein when the inlet of steam through said steam inlet pipe is cut off, and means operated by exhaust steam from said steam pump for forcing water from said heating chamber into said compensating chamber.

18. In a feed water heater, a heating chamber, a steam pump for supplying water to said chamber, an inlet pipe for steam into the heating chamber, and an inlet to said heating chamber for exhaust steam from said steam pump located to permit the pump to exhaust into the chamber and maintain steam pressure therein when the inlet of steam through said inlet pipe is arrested.

In testimony whereof I have signed my name to this specification.

SÉBASTIEN OTTO ALFRED FIEDLER.